United States Patent [19]

Copa et al.

[11] Patent Number: 5,240,619
[45] Date of Patent: Aug. 31, 1993

[54] TWO-STAGE SUBCRITICAL-SUPERCRITICAL WET OXIDATION

[75] Inventors: William M. Copa, Schofield; Richard W. Lehmann, Wausau, both of Wis.

[73] Assignee: Zimpro Passavant Environmental Systems, Inc., Rothschild, Wis.

[21] Appl. No.: 16,229

[22] Filed: Feb. 11, 1993

[51] Int. Cl.$^5$ .................... C02F 11/08; C02F 1/74
[52] U.S. Cl. ........................... 210/752; 210/761
[58] Field of Search ............... 210/750, 752, 761, 762, 210/765, 766, 908, 909

[56] References Cited

U.S. PATENT DOCUMENTS

| | | | |
|---|---|---|---|
| 3,849,536 | 11/1974 | Morgan | 423/206 |
| 3,917,460 | 11/1975 | Morgan | 23/283 |
| 4,141,829 | 2/1979 | Thiel et al. | 210/63 |
| 4,347,144 | 8/1982 | Bodenbenner | 210/761 |
| 4,525,283 | 6/1985 | Horak et al. | 210/762 |
| 4,604,957 | 8/1986 | Cederquist | 110/238 |
| 5,057,220 | 10/1991 | Harada et al. | 210/762 |
| 5,106,513 | 4/1992 | Hong | 210/761 |
| 5,183,577 | 2/1993 | Lehmann | 210/761 |

Primary Examiner—Thomas Wyse
Attorney, Agent, or Firm—Tipton L. Randall

[57] ABSTRACT

A two-stage wet oxidation process for COD removal from high strength wastewater is disclosed. The wastewater stream is treated in a first stage subcritical wet oxidation zone at temperatures between about 250° and 374° C. to remove a substantial portion of the COD. Subsequently, all or a portion of the first stage oxidized waste stream is treated in a second stage supercritical wet oxidation zone at temperatures of 374° to about 600° C. to remove any remaining COD content. Both stages of wet oxidation treatment are carried out at essentially the same system pressure.

16 Claims, 3 Drawing Sheets

TWO-STAGE SUBCRITICAL-SUPERCRITICAL WET OXIDATION

FIELD OF THE INVENTION

This invention is concerned with the wet oxidation of wastewater for COD removal. More particularly, it is concerned with a two-stage wet oxidation process for high strength wastewater, and specifically a first stage subcritical wet oxidation followed by a second stage supercritical wet oxidation.

BACKGROUND OF THE INVENTION

Wet oxidation is a well known technology for the destruction of pollutants in wastewater. The process involves treatment of the wastewater with an oxidant, generally molecular oxygen from an oxygen-containing gas, at elevated temperatures and pressures.

Wet oxidation at temperatures below the critical temperature of water, 374° C., is termed subcritical wet oxidation. The subcritical system operates at sufficient pressure to maintain a liquid water phase. This is a commercially used treatment process employed for conditioning sewage sludge, the oxidation of caustic sulfide wastes, regeneration of powdered activated carbon, and the oxidation of chemical production wastewaters, to name only a few applications. Complete removal of all pollutants from wastewater by wet oxidation at subcritical conditions generally cannot be achieved. Thus, subcritical wet oxidation may not provide the high degree of treatment required by governmental regulations for direct discharge of the oxidized effluent to the environment. A number of U.S. Patents disclose processes designed to achieve complete removal of pollutants from wastewaters by wet oxidation.

Morgan in U.S. Pat. Nos. 3,849,536 and 3,917,460 discloses a process and apparatus for wet combustion of pulping liquors. The wet oxidation occurs at subcritical conditions in two stages within a single vessel with air from the first stage oxidation separated prior to introduction of air for oxidation in the second stage.

In Thiel et al. U.S. Pat. No. 4,141,829 describe a subcritical wet oxidation with a catalytic vapor phase oxidation of volatile organics in the offgases.

Bodenbenner et al. in U.S. Pat. No. 4,347,144 disclose a two-stage subcritical wet oxidation process where a majority of the wastewater COD is removed in the first stage and an oxidizing agent stronger than oxygen is added to the liquid phase in the second stage for complete COD removal.

Horak et al. in U.S. Pat. No. 4,525,283 describe a catalytic two-stage subcritical wet oxidation system where both metal ions and carbonaceous materials are employed as catalysts for wet oxidation of wastewater.

In Cederquist U.S. Pat. No. 4,604,957 discloses a subcritical two-stage wet oxidation process where a large excess of oxygen is used in the second stage oxidation and then the oxygen is recycled to the first stage where oxidation of the majority (70-90%) of the organic content of the wastewater occurs.

Wet oxidation at temperatures above the critical temperature of water, 374° C., is termed supercritical wet oxidation. Above this critical temperature, no liquid phase is present, regardless of how much pressure is applied to the system. The properties of water in the supercritical phase are quite different from those in the liquid phase. Oxygen is miscible with supercritical water and thus oxidation reactions occur quite rapidly at these high temperatures, with an extremely high degree of destruction obtained for pollutants.

Supercritical wet oxidation is, however, a new technology with a number of operational problems involved. The high operating temperatures and pressures result in extreme corrosion problems as well as requiring expensive thick-walled piping and reaction vessels. Inorganic salts are not nearly as soluble in supercritical water as in liquid water, and these salts can precipitate under supercritical wet oxidation conditions, causing plugging of the equipment.

Wet oxidation of relatively high strength wastewaters, with chemical oxygen demand (COD) of about 20 grams per liter or greater, presents a most difficult problem, particularly for supercritical wet oxidation treatment. In the subcritical wet oxidation process, the exothermic oxidation reactions occur in an aqueous matrix. The heat released raises the temperature of the aqueous medium to some selected operating temperature. However, to initiate the oxidation reactions, the influent stream has to be preheated to a minimum temperature where the rate of oxidation and extent of oxidation in the wet oxidation reactor are sufficiently high that the selected operating temperature can be achieved. By balancing the heat exchange between oxidized effluent and influent feed, and the heat input, the selected operating temperature is reached. If excess heat is produced in the reactor vessel, this can be removed from the system by evaporation of liquid water within the reactor and removal of the steam produced.

In a supercritical wet oxidation system, the exothermic heat of oxidation released is utilized in raising the temperature of the supercritical water phase. If a high strength wastewater, having a COD of about 20 g/l or more, is introduced into the reactor with excess oxidizer, the oxidation reaction produces so much heat that the temperature of the contents rises, uncontrollably, to very high levels, e.g. 500°-600° C. A phenomenon referred to as a supercritical or diffusion flame has been observed in supercritical wet oxidation. The flame can ignite at temperatures near 500° C. in the presence of oxidizable materials, e.g. a six mole percent concentration of fuel such as methane or methanol. Ignition of a supercritical flame is accompanied by extremely high temperatures. At supercritical conditions no liquid water phase is present to be vaporized to steam to remove heat from the reactor vessel.

A supercritical wet oxidation unit is constructed with design parameters for operation at a maximum temperature (e.g. 550° C.) and a maximum pressure (e.g. 350 atm). If a supercritical flame ignites in the unit, the design temperature limits can be exceeded and a catastrophic failure of the unit can result. Applicants have discovered a method of overcoming this obstacle without sacrificing the quality of the oxidized effluent obtained by supercritical wet oxidation.

It is an objective of the invention to control the temperature and the pressure of a wet oxidation system when treating high strength wastewaters. It is a further objective to treat a high strength wastewater without diluting the waste, dilution requiring a larger capacity treatment system. It is also an objective of the invention to provide a treated effluent which can meet stringent discharge requirements.

SUMMARY OF THE INVENTION

The invention comprises a process for wet oxidation of wastewater containing more than about 20 grams per liter of chemical oxygen demand (COD) comprising the steps:

(a) mixing said wastewater and an oxygen-containing gas to form an oxidation mixture;

(b) heating said oxidation mixture in a first reaction zone to a temperature greater than about 250° C. and less than 374° C., and at a pressure sufficient to maintain a portion of said wastewater in the liquid phase, for a time sufficient to remove a substantial portion of the COD therefrom;

(c) thereafter, at essentially the same pressure, heating at least a portion of said oxidation mixture, in a second reaction zone, to a temperature greater than 374° C. and less than about 600° C. for a time sufficient to remove substantially any remaining portion of COD therefrom; and (d) cooling said thus treated oxidation mixture and separating the mixture to a gaseous phase and an oxidized liquid phase.

BRIEF DESCRIPTON OF THE DRAWINGS

The present invention and its various characteristics shall be more readily understood from a reading of the following description with reference to the accompanying figures, namely respectively:

DESCRIPTION OF THE PREFERRED EMBODIMENTS

Figure 1:
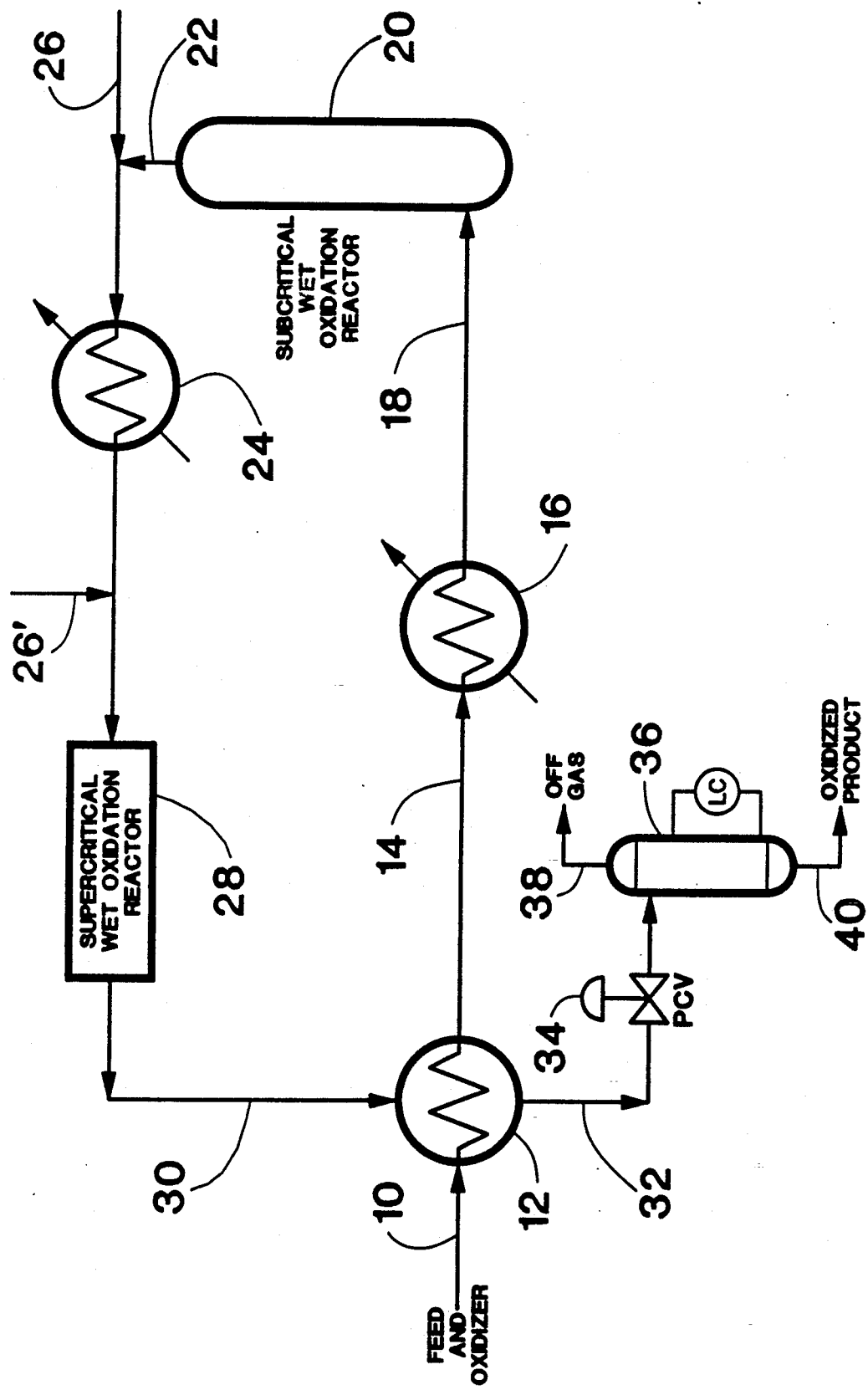
FIG. 1 shows a schematic flow diagram where the whole wastewater stream receives both subcritical and supercritical wet oxidation treatment.

Referring to FIG. 1 a high strength wastewater is pressurized and mixed with an oxygen-containing gas to form an oxidation mixture. The oxygen-containing gas may be air, oxygen enriched air or essentially pure oxygen. The amount of oxygen gas mixed with the wastewater may be in excess of the stoichiometric amount required for complete oxidation of the COD of the wastewater. Alternatively, less than a stoichiometric amount of oxygen gas may be used depending upon the particular wastewater treated.

The oxidation mixture flows through a conduit 10 to a heat exchanger 12 which heats the mixture against a hot oxidized effluent mixture leaving the system. The heated oxidation mixture flows through a conduit 14, traversing a heater 16 used for startup of the system. The heated oxidation mixture then flows via a conduit 18 to a reactor vessel 20. The reactor 20 comprises a first reaction zone where the oxidation mixture receives subcritical wet oxidation treatment, although some oxidation may occur as the oxidation mixture is heated in the exchanger 12 or the heater 16. The reactor vessel 20 provides the residence time where the bulk of the subcritical oxidation occurs. For the high strength wastewaters treated here, the subcritical wet oxidation in the reactor vessel 20 destroys a substantial portion of the oxidizable constituents and removes a substantial portion of the COD of those wastewaters. The operating temperature for the subcritical oxidation may be as low as 250° C. to as high as about 370° C. The operating pressure is sufficient to maintain at least a portion of the wastewater in the liquid phase within the reactor vessel 20. The liquid water provides a heat sink for the exothermic oxidation reaction which occur within the reactor vessel 20. The pressure at which the system operates depends on the temperature chosen for the subcritical wet oxidation treatment stage. The pressure will be the steam pressure at the chosen temperature plus the pressure of the oxygen-containing gas at that temperature. The operating pressure for the system thus may vary from a low of about 1,000 psig (68 atm or 6.895 MPa) up to about 6,500 psig (442 atm or 44.8 MPa).

After subcritical wet oxidation treatment, the oxidation mixture exits the reactor vessel 20 via a conduit 22 and is heated by a heater 24 to supercritical water temperatures, in excess of 374° C. Additional oxidant, such as oxygen gas, air or chemical oxidant such as hydrogen peroxide or ozone, may optionally be added, via a conduit 26, to the oxidation mixture prior to the mixture entering the heater 24, or after heating the oxidation mixture to supercritical water temperatures via a conduit 26'. The additional oxidant may be necessary where less than a stoichiometric amount of oxygen gas was added to the raw wastewater prior to subcritical wet oxidation treatment or where it is desirable to increase the concentration of the oxidant. A reactor vessel 28 provides the residence time for the supercritical wet oxidation treatment, which is generally only a fraction of the residence time employed for the subcritical reactor 20. The supercritical wet oxidation oxidizes the residual COD components present in the subcritical oxidized effluent. Since most of the COD has been removed in the subcritical wet oxidation, there is little possibility for a highly exothermic supercritical wet oxidation reaction to occur where the excess heat produced would result in excessive temperature increases which could cause catastrophic system failure.

The supercritical oxidation mixture then leaves the reactor vessel 28 and traverses a conduit 30 to enter the heat exchanger 12 where it is cooled against the influent oxidation mixture. The supercritical treatment zone therefore comprises that portion of the system at temperatures in excess of 374° C. In an alternative system configuration, the heater 24 and the reactor vessel 28 are combined in a single element which comprises the supercritical treatment zone. The cooled oxidized effluent mixture, after exiting the heat exchanger 12, then flows via a conduit 32 and traverses a pressure control valve 34 which maintains the system pressure. As mentioned earlier, the pressure at which the system operates depends primarily on the temperature chosen for the subcritical wet oxidation treatment stage. However, wastewater characteristics and treatment goals may dictate operation at different pressures for any one give temperature. The pressure will be the steam pressure at the chosen temperature plus the pressure of the oxygen-containing gas at that temperature. The depressurized oxidized effluent mixture then enters a separator vellel 36 where vapor/liquid separation occurs. A gaseous phase exits from an upper outlet 38 and an oxidized liquid phase discharges from a lower conduit 40.

There may be situations where it is not necessary to treat the whole waste stream by supercritical wet oxidation. It is not difficult to separate the vapor phase from the liquid phase in the subcritical wet oxidation reactor vessel 20 and treat either of the separated phases by supercritical wet oxidation.

Figure 2:
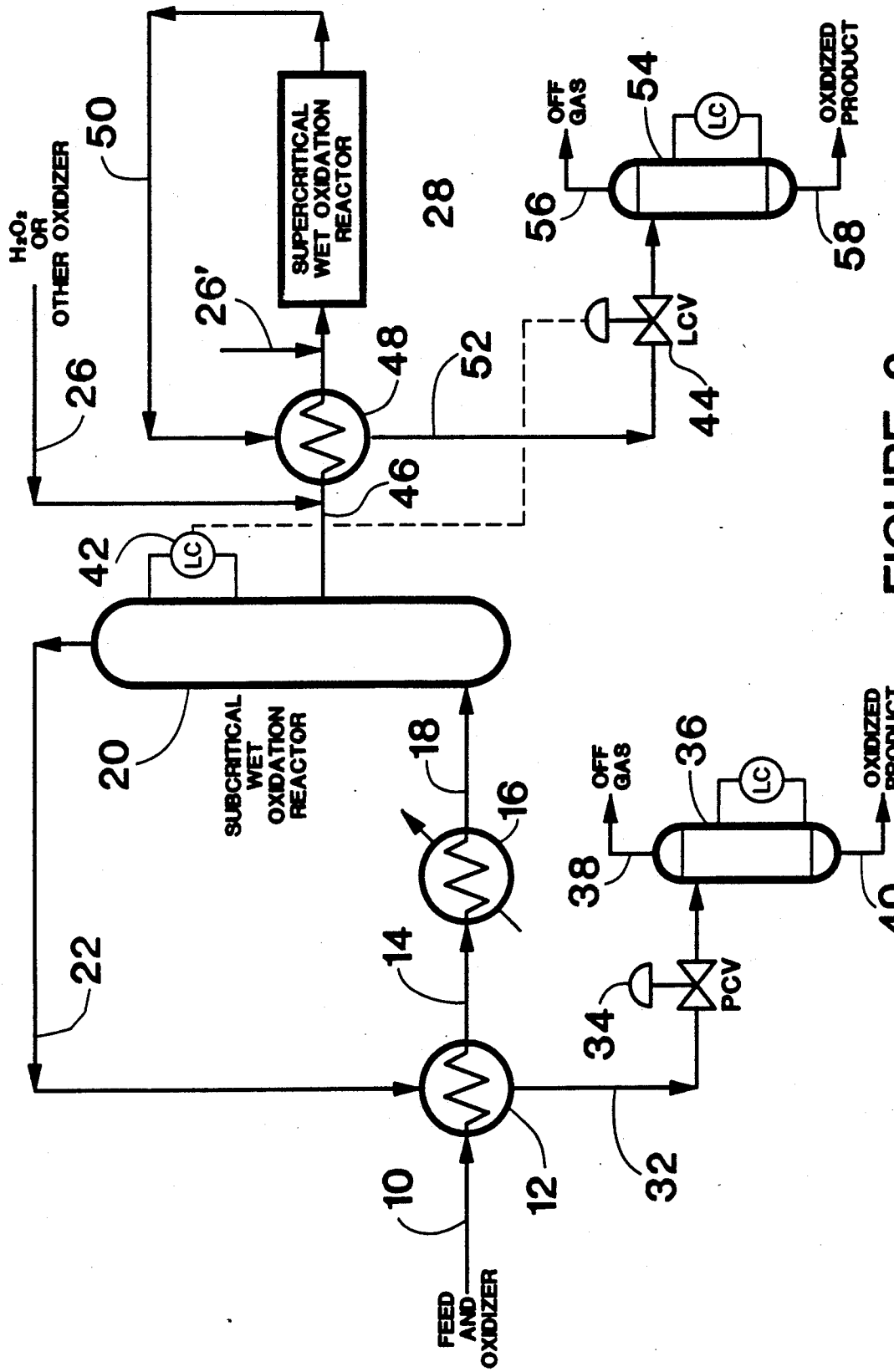
FIG. 2 shows a schematic flow diagram of another embodiment where the whole wastewater stream receives subcritical wet oxidation treatment and only one portion then receives supercritical wet oxidation treatment.

Referring to FIG. 2, the raw oxidation mixture receives subcritical wet oxidation treatment as described for FIG. 1 where a substantial portion of the COD is removed in the reactor vessel 20. Those components common to FIGS. 1 and 2 are shown with the same indica. The subcritical oxidation reactor vessel 20 contains both a liquid phase and a vapor phase. The vapor phase exits the reactor vessel 20 via a conduit 22 which delivers the vapor phase to the heat exchanger 12 for cooling and condensation of water vapor. The cooled vapors and condensed liquid flow via a conduit 32 to a pressure control valve 34 for pressure letdown. The mixture enters a separator vessel 36 where vapor/liquid separation occurs. A gaseous phase exits from an upper outlet 38 and an oxidized liquid phase discharges from a lower conduit 40.

The liquid phase level in the reactor vessel 20 is controlled by a level controller 42, which operates a level control vale 44. Upon the liquid level in the reactor vessel 20 reaching a selected upper level, the level control valve 44 opens and the liquid phase flows from the reaotor vessel 20 via a conduit 46 to a heater/heat exchanger 48 where the liquid is heated to greater than 374° C., bringing the liquid to supercritical conditions. Optionally, additional oxidant, such as oxygen gas, air or other chemical oxidant such as hydrogen peroxide or ozone, may be added, via a conduit 26, to the liquid phase in the conduit 46 prior to the liquid entering the heater/heat exchanger 48 or alternatively to the supercritical fluid that enters the supercritical reactor via a conduit 26'. The now supercritical phase enters the supercritical reactor vessel 28 for additional wet oxidation treatment where any residual COD is removed. The supercritical phase then flows via a conduit 50 and enters the heater/heat exchanger 48 where it cools to subcritical temperatures by heat exchange against the liquid phase which is entering the supercritical treatment zone from the reactor vessel 20. The supercritical wet oxidation treated liquid phase now cooled, plus any vapor phase, then flows via a conduit 52 to the level control valve 44 for depressurization. The depressurized oxidized liquid phase then enters a separator vessel 54 where vapor/liquid separation occurs. A gaseous phase exits from an upper outlet 56 and an oxidized liquid phase discharges from a lower conduit 58.

Treatment of only the subcritical wet oxidation vapor phase by supercritical wet oxidation has a number of advantages. Little if any salts are present in the vapor phase and thus heating it to supercritical conditions will not cause salt precipitation. Further, the products of subcritical wet oxidation are generally low molecular weight oxygenated compounds which reside in the vapor phase. Supercritical wet oxidation of this phas thus destroys the residual COD often found in subcritical wet oxidation effluents.

Figure 3:
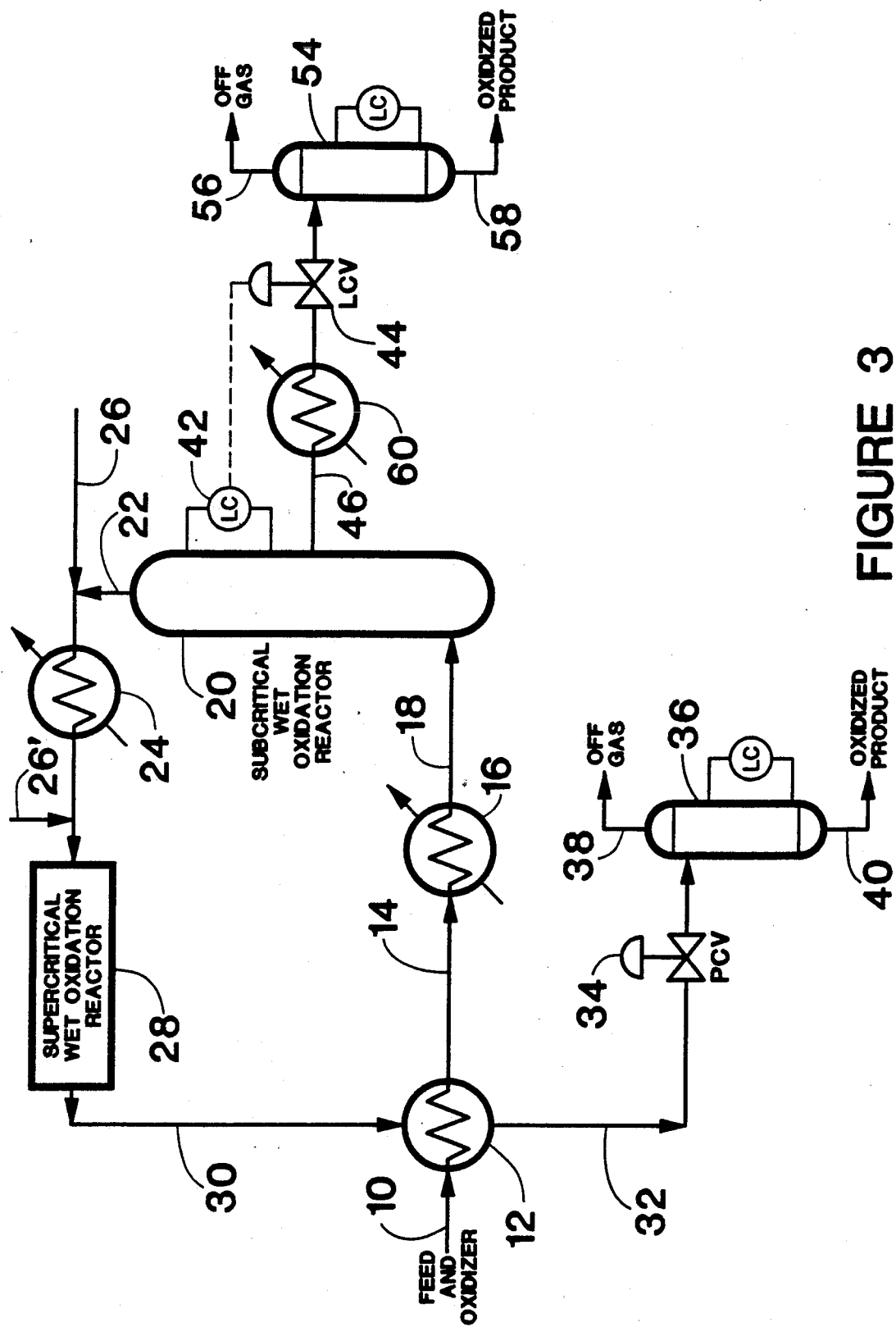
FIG. 3 shows a schematic flow diagram of yet another embodiment where the whole wastewater stream receives subcritical wet oxidation treatment and only one portion then receives supercritical wet oxidation treatment.

Referring to FIG. 3, the raw oxidation mixture again receives subcritical wet oxidation treatment as described for FIGS. 1 and 2 where a substantial portion of the COD is removed in the reactor vessel 20. Those components common to FIGS. 1, 2 and 3 are shown with the same indica. The subcritical oxidation reactor vessel 20 contains both a liquid phase and a vapor phase.

The liquid phase level in the reactor 20 is controlled by a level controller 42, which operates a level control valve 44. Upon the liquid level in the reactor vessel 20 reaching a selected upper level, the liquid phase flows from the reactor 20 via a conduit 46 to a cooler 60 where the liquid is cooled. Thus, any dissolved salts, ash or suspended solids are carried from the reactor 20 with the liquid phase. The cooled liquid phase passes through the level control valve 44 and enters a separator vessel 54 where depressurization occurs. Vapor/liquid separation occurs within the separator vessel 54 and a gaseous phase exits from an upper outlet 56 and an oxidized liquid phase discharges from a lower conduit 58.

The vapor phase in the subcritical wet oxidation reactor vessel 20 exits via a conduit 22 and enters a heater 24 which heats the vapor phase to supercritical temperatures, greater than 374° C. Optionally, additional oxidant, such as oxygen gas, air or other chemical oxidants such as hydrogen peroxide or ozone, may be added, via a conduit 26, to the vapor phase in the conduit 22 prior to the vapor entering the heater 24 or alternatively to the supercritical fluid that enters the supercritical reactor via a conduit 26'. The now supercritical phase enters the supercritical reactor 28 for additional wet oxidation treatment where any residual COD is removed. The volatile compounds present in the raw wastewater or produced on subcritical wet oxidation treatment are thus totally destroyed by supercritical wet oxidation treatment of the vapor phase. The supercritical phase then flows via a conduit 30 and enters the heat exchanger 12 where it cools to subcritical temperatures, by heat exchange against the oxidation mixture entering the system, to give a mixture of condensed liquid and gases. This mixture flows via a conduit 32 to the pressure control valve 34 for letdown to atmospheric pressure. The depressurized mixture then enters a separator vessel 36 where vapor/liquid separation occurs. A gaseous phase exits from an upper outlet 38 and an oxidized liquid phase discharges from a lower conduit 40.

It may be desirable to operate the two-stage system of FIG. 3 such that the major portion of the wastewater is treated by both subcritical and supercritical wet oxidation. Operation of the system of FIG. 3 with a high oxygen-containing gas to wastewater ratio and/or low system pressure promotes vaporization of liquid water and oxidizable components to the vapor phase and consequently oxidation in the supercritical treatment zone. Likewise, adjusting the pH of the wastewater can effect volatilization of pollutants to the vapor phase within the subcritical reaction zone. Making the wastewater acidic (pH<7) promotes volatilization of acidic components such as organic acids, while making the wastewater basic (pH>7) promotes volatilization of basic components such as organic amines.

In an alternative flow scheme for FIG. 3, the treated supercritical oxidation mixture is cooled against feed vapor phase from the reactor vessel 20. In this alternative configuration, the heater 24 is replaced by a heat exchanger. The cooled supercritical wet oxidation treated vapo phase is then cooled further by heat exchange with raw influent oxidation mixture in the heat exchanger 12 as described above.

From the foregoing description, one skilled in the art can easily ascertain the essential characteristics of the invention and, without departing from the spirit and scope thereof, make various changes and modifications to adapt it to various uses.

We claim:

1. A process for wet oxidation of wastewater containing more than about 20 grams per liter of chemical oxygen demand (COD) comprising the steps:
    (a) mixing said wastewater and an oxygen-containing gas to form an oxidation mixture;
    (b) heating said oxidation mixture in a first reaction zone to a temperature greater than about 250° C. and less than 374° C., and at a pressure sufficient to maintain a portion of said wastewater in the liquid phase, for a time sufficient to remove a substantial portion of the COD therefrom;
    (c) thereafter, at essentially the same pressure, heating at least a portion of said thus treated oxidation mixture from step (b), in a second reaction zone, to a temperature greater than 374° C. and less than about 600° C. for a time sufficient to remove substantially any remaining portion of COD therefrom; and
    (d) cooling said thus treated oxidation mixture from step (c), and separating the mixture to a gaseous phase and an oxidized liquid phase.

2. A process according to claim 1 wherein essentially all of the oxidation mixture is heated to a temperature greater than 374° C. and less than about 600° C. in said second reaction zone.

3. A process according to claim 1 wherein only a liquid phase of said oxidation mixture is withdrawn from said first reaction zone and is heated to a temperature greater than 374° C. and less than about 600° C. in said second reaction zone.

4. A process according to claim 1 wherein only a vapor phase of said oxidation mixture is withdrawn from said first reaction zone and is heated to a temperature greater than 374° C. and less than about 600° C. in said second reaction zone.

5. A process according to claim 4 wherein the majority of wastewater and any volatile components therein is volatilized to the vapor phase which is withdrawn from said first reaction zone and is heated to a temperature greater than 374° C. and less than about 600° C. in said second reaction zone.

6. A process according to claim 1 further comprising adding additional oxidant to that portion of the oxidation mixture heated to a temperature greater than 374° C. and less than about 600° C. in said second reaction zone.

7. A proces according to claim wherein said oxygen-containing gas of step (a) is at least equal to the stoichioetric amount required for complete removal of the COD of said wastewater.

8. A process according to claim wherein said oxygen-containing gas of step (a) is at less than the stoichiometric amount required for complete removal of the COD of said wastewater.

9. A process according to claim 1 wherein said cooling of said thus treated oxidation mixture from step (c) is by heat exchange with said oxidation mixture of step (a).

10. A process according to claim 1 further comprising cooling said thus treated oxidation mixture of step (c) from said second treatment zon by heat exchange with said thus treated oxidation mixture from step (b) from said first treatment zone.

11. A process for wet oxidation of wastewater containing more than about 20 grams per liter of chemical oxygen demand (COD) comprising the steps:
    (a) mixing said wastewater and an oxygen-containing gas to form an oxidation mixture;
    (b) heating said oxidation mixture in a first reaction zone to a temperature greater than about 250° C. and less than 374° C., and at a pressure sufficient to maintain a portion of said wastewater in the liquid phase, for a time sufficient to remove a substantial portion of the COD therefrom;
    (c) volatilizing to the vapor phase the majority of said wastewater and any volatile component therein within said first reaction zone;
    (d) thereafter, at essentially the same pressure, heating said vapor phase portion of said thus treated oxidation mixture from step (b), in a second reaction zone, to a temperature greater than 374° C. and less than about 600° C. for a time sufficient to remove substantially any remaining portion of COD therefrom; and
    (e) cooling said thus treated oxidation mixture from step (d), and separating the mixture to a gaseous phase and an oxidized liquid phase.

12. A process according to claim 11 further comprising adding additional oxidant to said vapor phase portion of the oxidation mixture heated to a temperature greater than 374° C. and less than about 600° C. in said second reaction zone.

13. A process according to claim 11 wherein said oxygen-containing gas of step (a) is at least equal to the stoichiometric amount required for complete removal of the COD of said wastewater.

14. A process accordng to claim 11 wherein said oxygen-containing gas of step (a) is at less than the stoichiometric amount required for complete removal of the COD of said wastewater.

15. A process according to claim 11 wherein said cooling of said thus treated oxidation mixture from step (d) is by heat exchange with said oxidation mixture of step (a).

16. A process according to claim 11 further comprising cooling said thus treated oxidation mixture of step (d) from said second treatment zone by heat exchange with said thus treated vapor phase of step (c) from said first treatment zone.

* * * * *

UNITED STATES PATENT AND TRADEMARK OFFICE
CERTIFICATE OF CORRECTION

PATENT NO. : 5,240,619

DATED : August 31, 1993

INVENTOR(S) : William M. Copa et al.

It is certified that error appears in the above-identified patent and that said Letters Patent is hereby corrected as shown below:

Column 1, line 42, after "In", insert --U.S. Patent No. 4,141,829-- and delete "U.S. Patent No. 4,141,829 after "al.".
Col. 1, line 55, after "In", insert --U.S. Patent No. 4,604,957-- and delete "U.S. Patent No. 4,604,957" after "Cederquist".
Column 4, line 65, "vellel" should read --vessel--

Col. 6, line 61, "vapo" should read --vapor--

Col. 7, claim 7, line 49, insert --1-- after claim.
Col. 7, claim 8, line 53, insert --1-- after claim.

Signed and Sealed this

Twenty-second Day of March, 1994

Attest:

BRUCE LEHMAN

Attesting Officer    Commissioner of Patents and Trademarks